UNITED STATES PATENT OFFICE.

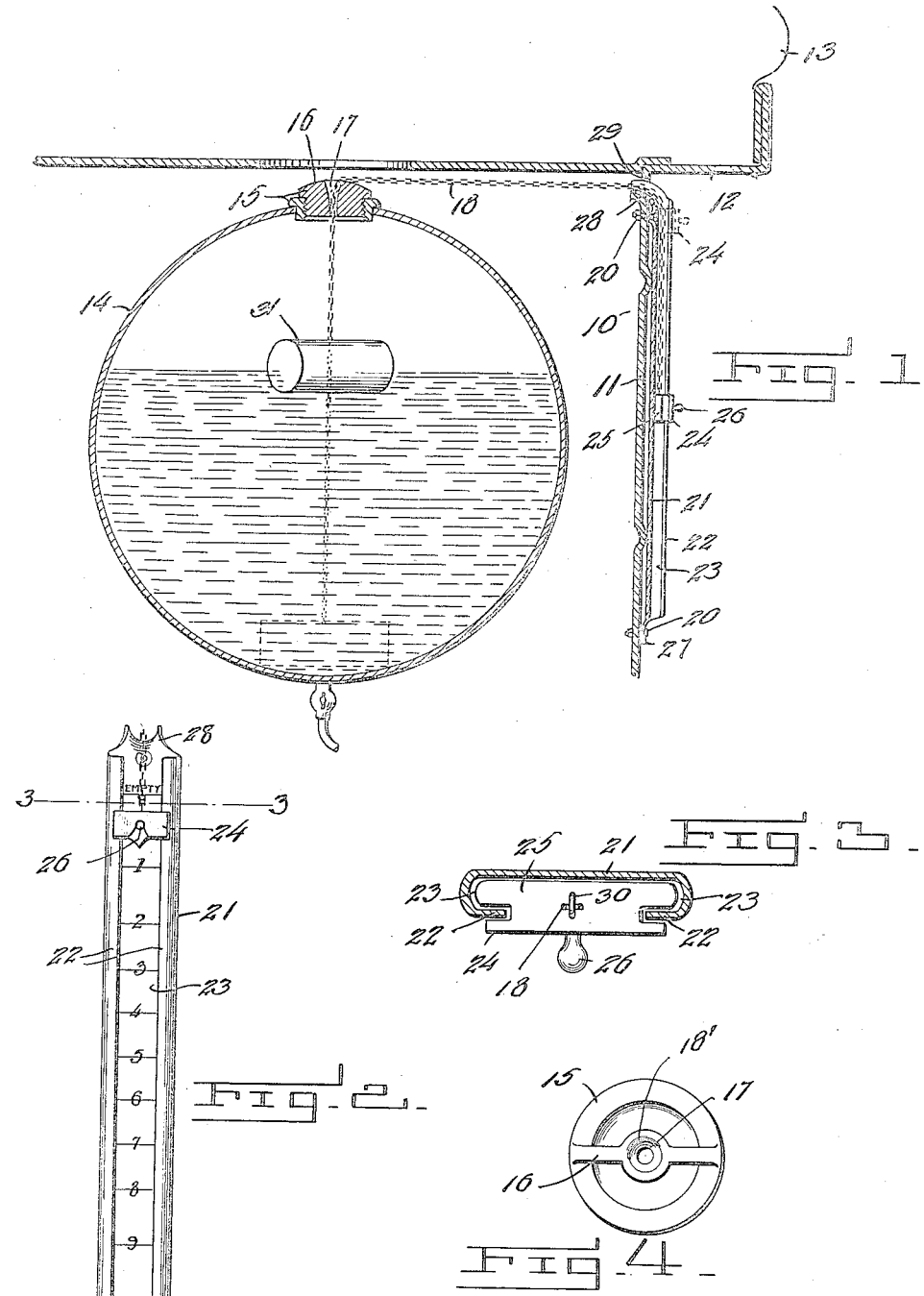

JOHN F. ROGERS, OF NEW YORK, N. Y.

FUEL-TANK GAGE.

1,225,178.

Specification of Letters Patent.  Patented May 8, 1917.

Application filed April 7, 1916. Serial No. 89,708.

*To all whom it may concern:*

Be it known that I, JOHN F. ROGERS, a citizen of the United States, residing at New York, in the county of New York and State of New York, have invented certain new and useful Improvements in Fuel-Tank Gages, of which the following is a specification.

The invention has for an object to provide a satisfactory gasolene gage which may be manufactured at a low cost and applied to tanks of ordinary cars without structural changes in the tanks, or cars, and without involving machine operations or other work except the boring or punching of a hole through wood or thin sheet metal, and reaming the opening in the brass filler cap generally used on tanks of motor vehicles as an air vent; these operations being such as any ordinary person is competent to perform with simple appliances usually at hand.

It is an important object of the invention to provide a gage device which will move an indicator on the front of the seat, so that the quantity of gasolene or other fuel carried in the tank of a motor vehicle may be ascertained without removal of seat cushions or unscrewing of the cap and other operations ordinarily involved in tanks generally used.

Additional objects, advantages and features of invention will lie in the particular construction of certain of the parts, their relative arrangement, and the nature of the combination of parts involved, as hereinafter described and shown in the drawings, wherein—

Figure 1 is a vertical sectional view of a portion of a vehicle seat and body construction with a fuel tank adjacent in the customary position.

Fig. 2 is a front view of the indicator.

Fig. 3 is a transverse sectional view on the line 3—3 of Fig. 2.

Fig. 4 is a view of the cap.

Figure 5:
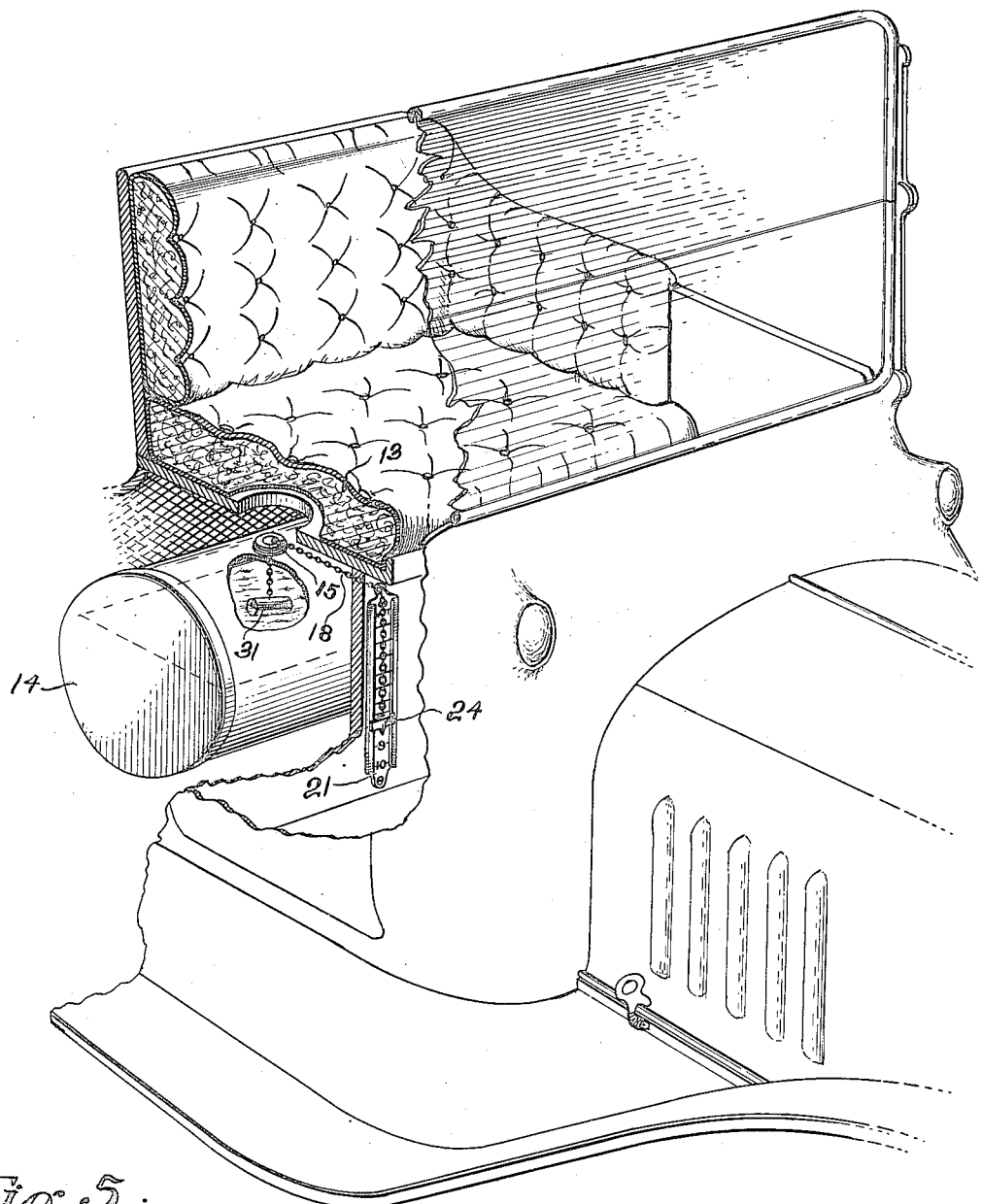
Fig. 5 is a fragmentary perspective view of a motor vehicle equipped with my invention.

There is illustrated a portion of an automobile body 10, including the front paneling 11 and seat supporting ledge 12, upon which the ordinary seat cushion 13 is removably disposed. A cylindrical, horizontally disposed tank 14 is mounted under the seat immediately to the rear of the panel, having the usual fitting or bushing 15 at the upper side with a large threaded opening therethrough receiving the filler cap 16. The cap is provided with a vent opening 17, to permit ingress of air as fuel is drawn from the tank. This opening is reamed or otherwise enlarged sufficiently to receive slidably a chain 18 of a small size, the upper side of the opening being preferably rounded or flared, as at 18', to permit ready sliding movement of the chain when extended horizontally without the tank. At the front of the panel 11 and secured thereto by means of two small bolts 20, there is a vertical indicator guide 21, stamped and formed integrally of one piece of sheet metal. It comprises a central elongated portion having inturned flanges 22 at each side, forming a channel 23, in which there is slidable an indicator weight 24, cast or otherwise formed to provide a suitable inner body portion 25 adapted to set loosely in the channel and under the flanges 22 for vertical reciprocating movement therein, and having a member 26 adapted to be grasped by the hand for manipulation of the indicator as desired. The guide has lower and upper ears 27 and 28 extended therefrom at each end. The ears are apertured and receive the bolts 20 therethrough. The upper ear beyond the aperture therethrough is curved backward, being projected into a suitable opening 29 through the panel 11 to receive and guide the chain 18 which is extended forwardly through the opening and then downwardly to the indicator weight 25. The sides of the ear 28 at its upper part are curved outwardly slightly so as to form a rounded channel for the chain 18, and the ear 28 may also be slightly set forwardly at its base, in order that the chain will be held beyond the head of the bolt 20, and casual engagement between the chain and bolt head prevented. The chain is connected to the weight 25 by means of a suitable eye element 30 at the upper side of the weight 25, with which the chain is connected in any familiar way. From the indicator the chain is extended through the opening 29 to the cap 16 through which it is passed. To its end within the tank there is secured a float 31, which preferably comprises a cylinder of suitable kind—wood having been used—of a diameter a little less than the diameter of the filling opening of the tank, and having a length which will permit it to fall very close to the lowermost part of the tank, as indicated in dotted lines in Fig. 1.

If desired, a ball may be used in place of the cylinder. The cylinder enables the float to be easily formed with ample weight, to assure raising of the indicator weight 25 as the level of the fuel in the tank falls.

Upon the outer surface of the guide 21 centrally of the channel 23 there is formed a suitable scale for indicating in gallons and any desired fractional parts of a gallon the quantity of fluid in the tank by means of the position of the lower edge of the weight 25. The chain 18 is of a length to support the weight 25 at the upper limit of its movement in the guide when the float 31 is at the lower limit of its movement in the tank. Consequently, the ordinals on the scale read from the top downwardly, the weight 25 being at the lower part of the guide when the tank is full, and vice versa.

The formation of the opening 29 in the panel 11 may be easily accomplished by use of a hammer and nail or other suitable punching appliance, and it will be apparent that no alterations in structural details of the car or tank are required in order to install my appliance. The portion 26 of the indicator weight serves to permit manipulation of the device to free the chain in case it becomes kinked or its movement otherwise impeded accidentally.

In introducing fuel into the tank, my device does not require to be removed, and it is only necessary to unscrew the cap 15, and slide it forwardly upon the chain 18 a distance, allowing the chain to remain in the filling opening, and as it is possible to use a very small chain for this purpose, it will not interfere with the insertion of the usual funnel or other filling devices.

What is claimed:

1. The combination with a tank having a filling opening in the top thereof, and an upright panel arranged at one side of the tank, of a removable apertured closure for the filling opening of the tank, an indicator plate applied to the panel, an indicator weight slidable upon the indicator plate, a float in the tank, and a flexible member operatively connecting the float and indicator weight and passing loosely through the aperture of the closure.

2. The combination with a tank having a filling opening in the top thereof, and an upright panel arranged at one side of the tank, of a removable apertured closure for the filling opening of the tank, the upper end of the aperture being flared, an indicator plate applied to the panel, an indicator weight slidably mounted upon the indicator plate, a float in the tank, and a flexible member operatively connecting the float to the indicator weight, said flexible member passing upwardly from the float, through the aperture of the closure, and laterally to the panel, the flared upper end of the aperture in the closure providing a guide for the flexible member.

3. The combination with a tank having a filling opening in the top thereof and an upright panel arranged at one side of the tank, of a removable apertured closure for the filling opening of the tank, an upright indicator plate applied to the panel and formed at its upper end with an integral ear which is longitudinally concaved and curved rearwardly, an indicator weight slidable upon the indicator plate, a float in the tank, and a flexible member operatively connecting the float and the indicator weight, said flexible member extending through the panel and being guided by the rearwardly curved ear of the indicator plate.

4. The combination with a tank having a filling opening in the top thereof and an upright panel arranged at one side of the tank, of a removable apertured closure for the filling opening of the tank, the upper end of the aperture being flared, an upright indicator plate applied to the panel and formed at the upper end thereof with an integral ear which is longitudinally concaved and curved rearwardly, an indicator weight slidable upon the indicator plate, a float in the tank, and a flexible member operatively connecting the float and the indicator weight, said flexible member extending from the float upwardly through the aperture of the closure laterally to the rearwardly curved ear of the indicator plate, and downwardly to the indicator weight, the flared upper end of the aperture in the closure and the curved ear of the indicator plate providing guide means for the flexible member.

In testimony whereof I have affixed my signature in presence of two witnesses.

JOHN F. ROGERS.

Witnesses:
G. W. GARRISON,
Jos. R. McDONALD.